(12) United States Patent
Liston et al.

(10) Patent No.: US 10,937,167 B2
(45) Date of Patent: Mar. 2, 2021

(54) AUTOMATED GENERATION OF PRE-LABELED TRAINING DATA

(71) Applicant: Cisco Technology, Inc., San Jose, CA (US)

(72) Inventors: Rob Liston, Menlo Park, CA (US); John G. Apostolopoulos, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/258,037

(22) Filed: Jan. 25, 2019

(65) Prior Publication Data
US 2019/0156487 A1 May 23, 2019

Related U.S. Application Data

(63) Continuation of application No. 15/397,987, filed on Jan. 4, 2017.

(51) Int. Cl.
*G06T 7/11* (2017.01)
*G06T 7/194* (2017.01)
(Continued)

(52) U.S. Cl.
CPC ............. *G06T 7/11* (2017.01); *G06T 7/194* (2017.01); *G06T 11/00* (2013.01); *G06T 11/60* (2013.01);
(Continued)

(58) Field of Classification Search
CPC . G06T 7/11; G06T 3/0018; G06T 7/33; G06T 5/006; G06T 2207/30208; G02B 13/06
See application file for complete search history.

(56) References Cited

U.S. PATENT DOCUMENTS 5,590,224 A  12/1996  Fast et al.
5,875,108 A   2/1999  Hoffberg et al.
(Continued)

OTHER PUBLICATIONS

Jun-Yan Zhu et al., "Learning a Discriminative Model for the Perception of Realism in Composite Images", The IEEE Conference on Computer Vision (ICCV), 2015, pp. 3943-3951, 9 pages.
(Continued)

*Primary Examiner* — Mia M Thomas
(74) *Attorney, Agent, or Firm* — Edell, Shapiro & Finnan, LLC

(57) ABSTRACT

Presented herein are techniques for automatically generating object segmentation training data. In particular, a segmentation data generation system is configured to obtain training images derived from a scene captured by one or more image capture devices. Each training image is a still image that includes a foreground object and a background. The segmentation data generation system automatically generates a mask of the training image to delineate the object from the background and, based on the mask automatically generates a masked image. The masked image includes only the object present in the training image. The segmentation data generation system composites the masked image with an image of an environmental scene to generate a composite image that includes the masked image and the environmental scene.

20 Claims, 13 Drawing Sheets

(51) Int. Cl.
  *G06T 11/60* (2006.01)
  *G06T 11/00* (2006.01)
(52) U.S. Cl.
  CPC ............... *G06T 2207/10004* (2013.01); *G06T 2207/10024* (2013.01); *G06T 2207/20081* (2013.01)

(56) References Cited

U.S. PATENT DOCUMENTS

| | | | |
|---|---|---|---|
| 5,889,885 | A | 3/1999 | Moed et al. |
| 6,337,917 | B1 | 1/2002 | Onural et al. |
| 7,492,957 | B1 | 2/2009 | Bonhaus et al. |
| 8,542,908 | B2 * | 9/2013 | Simakov ............ G06K 9/00711 382/154 |
| 9,047,677 | B2 * | 6/2015 | Sedky ..................... G06T 7/90 |
| 9,251,437 | B2 * | 2/2016 | Krizhevsky .......... G06K 9/6255 |
| 9,462,387 | B2 * | 10/2016 | Oomen .................. G10K 15/12 |
| 9,805,301 | B1 * | 10/2017 | Owechko ............ G06K 9/00624 |
| 10,044,944 | B2 * | 8/2018 | Adsumilli ................. G06T 7/11 |
| 10,078,782 | B2 * | 9/2018 | Krichen .................. G06T 7/11 |
| 10,186,038 | B1 * | 1/2019 | Kluckner .............. G06K 9/6201 |
| 10,535,141 | B2 * | 1/2020 | Movshovitz-Attias ...................... G06T 7/11 |
| 2005/0129305 | A1 | 6/2005 | Chen et al. |
| 2006/0018521 | A1 | 1/2006 | Avidan |
| 2007/0217676 | A1 | 9/2007 | Grauman et al. |
| 2008/0107304 | A1 | 5/2008 | Coulter et al. |
| 2010/0177955 | A1 * | 7/2010 | Simakov ............ G06K 9/00711 382/154 |
| 2010/0290668 | A1 | 11/2010 | Friedman et al. |
| 2010/0302395 | A1 | 12/2010 | Mathe et al. |
| 2014/0056479 | A1 | 2/2014 | Bobbitt et al. |
| 2014/0177947 | A1 | 6/2014 | Krizhevsky et al. |
| 2014/0184644 | A1 | 7/2014 | Sharma et al. |
| 2015/0170002 | A1 | 6/2015 | Szegedy et al. |
| 2015/0248590 | A1 | 9/2015 | Li et al. |
| 2015/0310274 | A1 | 10/2015 | Shreve et al. |
| 2015/0334398 | A1 * | 11/2015 | Socek ..................... G06T 7/174 375/240.26 |
| 2016/0065930 | A1 | 3/2016 | Chandra et al. |
| 2016/0335796 | A1 * | 11/2016 | Roimela ................. G06T 17/05 |
| 2017/0083765 | A1 | 3/2017 | Risinger et al. |
| 2017/0083766 | A1 | 3/2017 | Risinger et al. |
| 2017/0083790 | A1 | 3/2017 | Risinger et al. |
| 2017/0244908 | A1 | 8/2017 | Flack et al. |
| 2018/0144244 | A1 | 5/2018 | Masoud et al. |
| 2018/0165813 | A1 | 6/2018 | Mai |
| 2018/0250826 | A1 | 9/2018 | Jiang et al. |
| 2018/0260668 | A1 * | 9/2018 | Shen ....................... G06T 11/00 |

OTHER PUBLICATIONS

Amy Bearman et al., "What's the Point: Semantic Segmentation with Point Supervision", arXiv:1506.02106v5 [cs. CV], Jul. 23, 2016, 16 pages.

Suyog Dutt Jain et al., "Click Carving: Segmenting Objects in Video with Point Clicks", arXiv:1607.01115v1 [cs.CV], Jul. 5, 2016, 12 pages.

Vijay Badrinarayanan et al., "SegNet: A Deep Convolutional Encoder-Decoder Architecture for Image Segmentation", arXiv:1511.00561v3 [cs.CV], Oct. 10, 2016, 14 pages.

\* cited by examiner

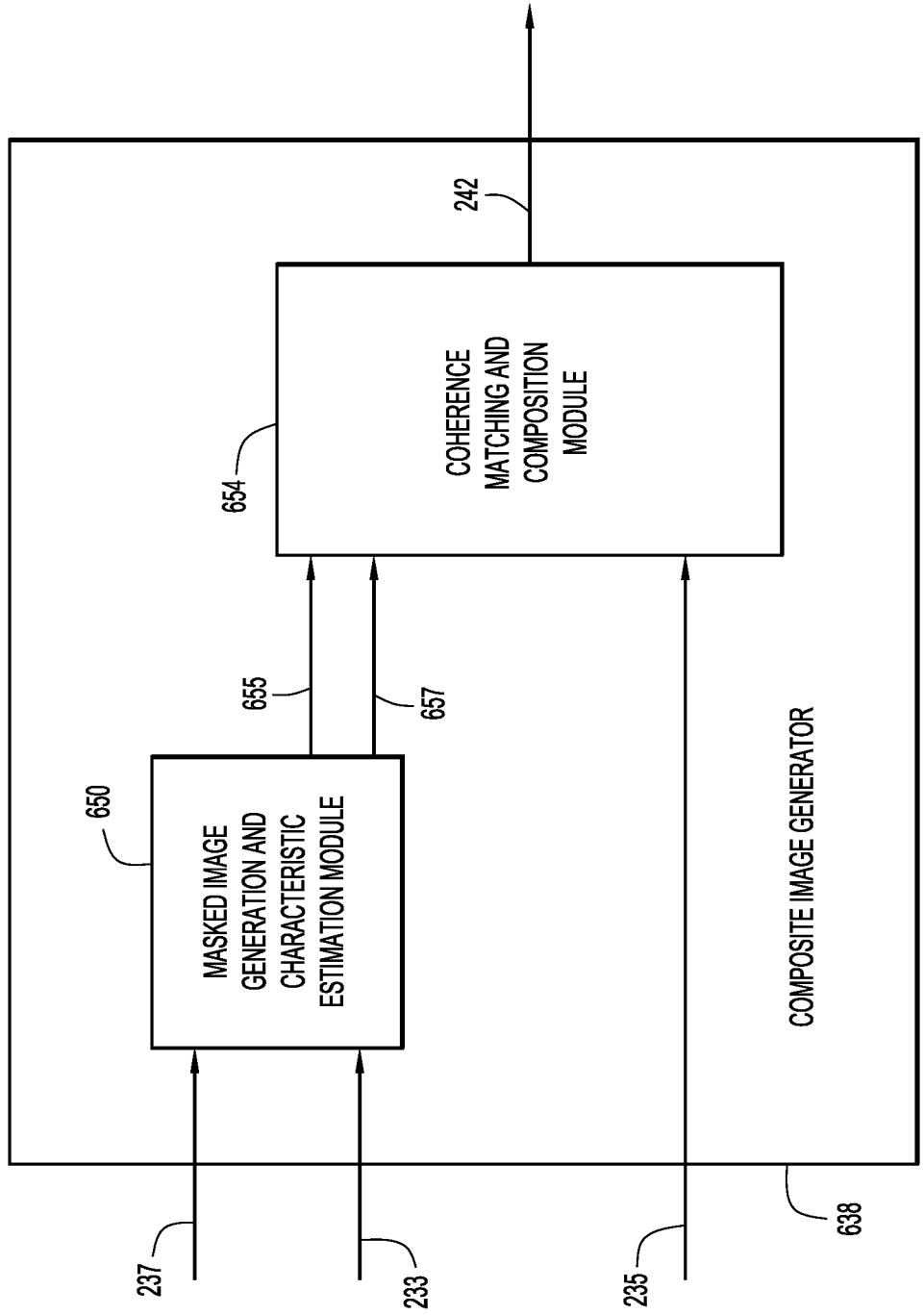

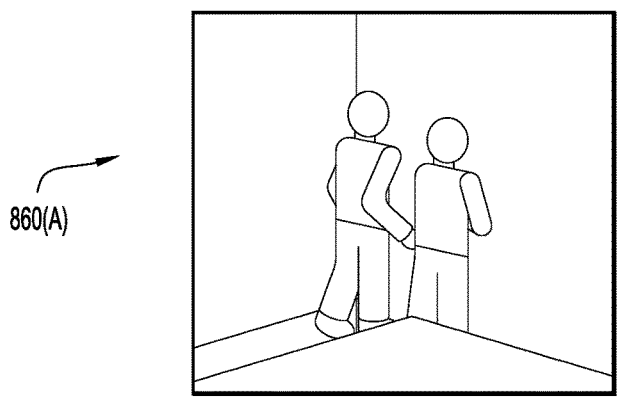
860(A)   FIG. 9A
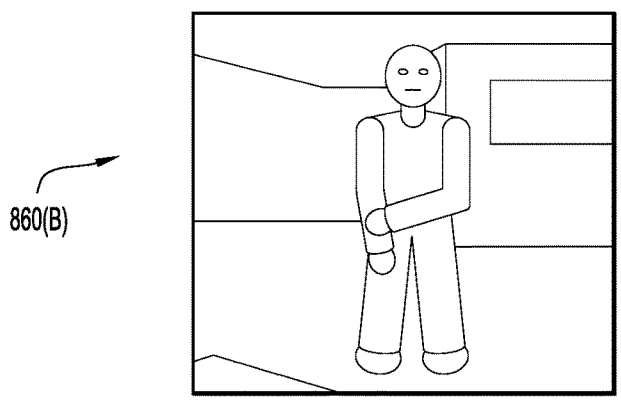
860(B)   FIG. 9B
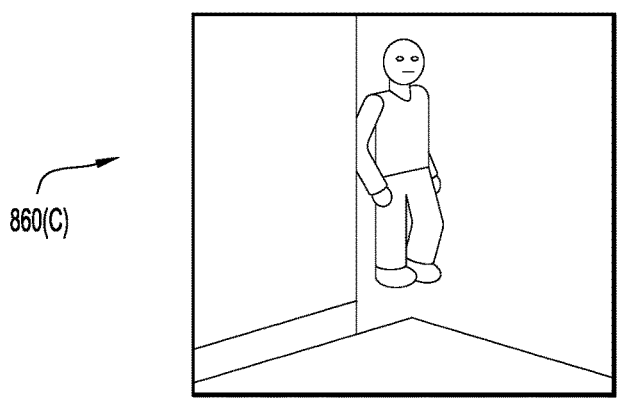
860(C)   FIG. 9C
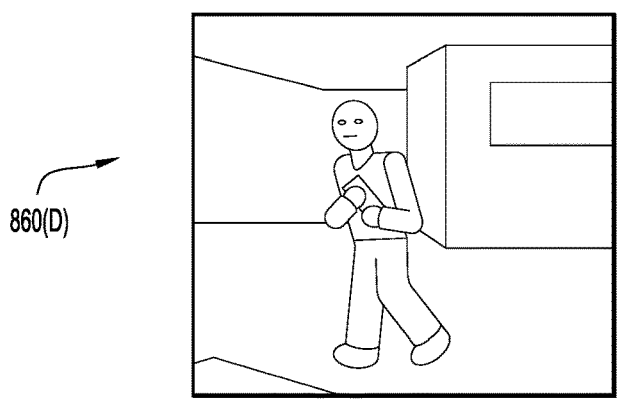
860(D)   FIG. 9D

865(A)

865(B)

865(C)

865(D)

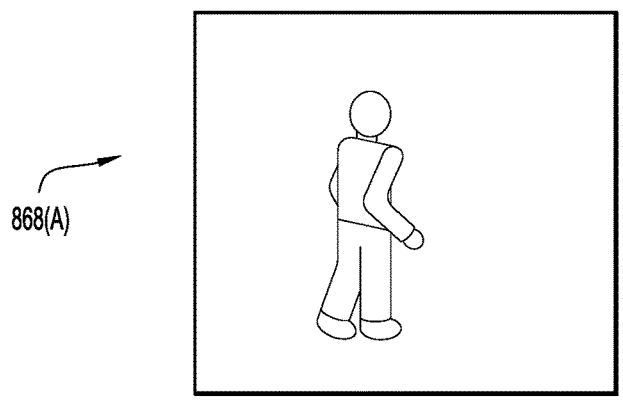
868(A)     FIG.11A
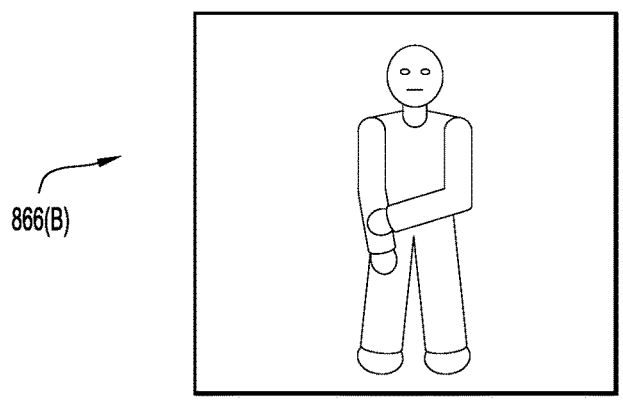
866(B)     FIG.11B
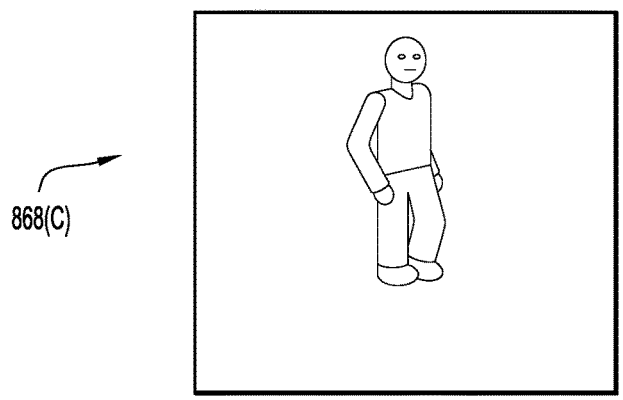
868(C)     FIG.11C
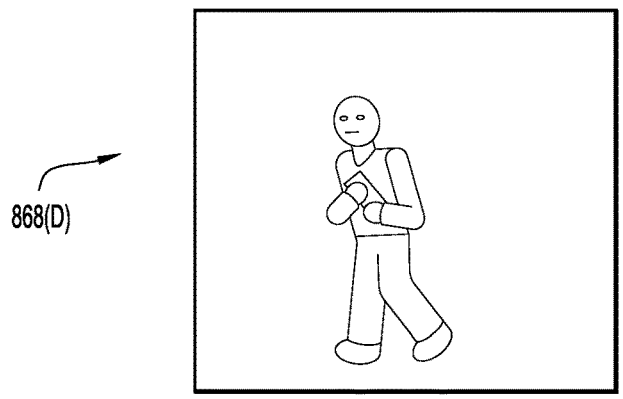
868(D)     FIG.11D

AUTOMATED GENERATION OF PRE-LABELED TRAINING DATA

CROSS REFERENCE TO RELATED APPLICATION

This application is a continuation of U.S. application Ser. No. 15/397,987, filed Jan. 4, 2017, the entirety of which is incorporated herein by reference.

TECHNICAL FIELD

The present disclosure relates to semantic image segmentation.

BACKGROUND

Semantic image segmentation refers to a process in which an image is partitioned to identify regions (e.g., "regions of interest") within the image that include or otherwise represent an object, such as a person. The image regions may be contiguous or non-contiguous shapes in the image coordinate space. A "pixel-wise region" has an arbitrary shape with pixel resolution. A "rectangular region" is defined by a bounding box.

BRIEF DESCRIPTION OF THE DRAWINGS

FIG. 6 is a functional block diagram illustrating one arrangement for a composite image generator configured to perform coherence matching, in accordance with examples presented herein.

FIGS. 9A, 9B, 9C, and 9D are schematic representations of images that may be captured by an image capture device.

FIGS. 11A, 11B, 11C, and 11D are schematic representations of segmented images that may be generated by a trained neural network for the captured images of FIGS. 9A, 9B, 9C, and 9D, respectively.

DESCRIPTION OF EXAMPLE EMBODIMENTS

Overview

Figure 1:
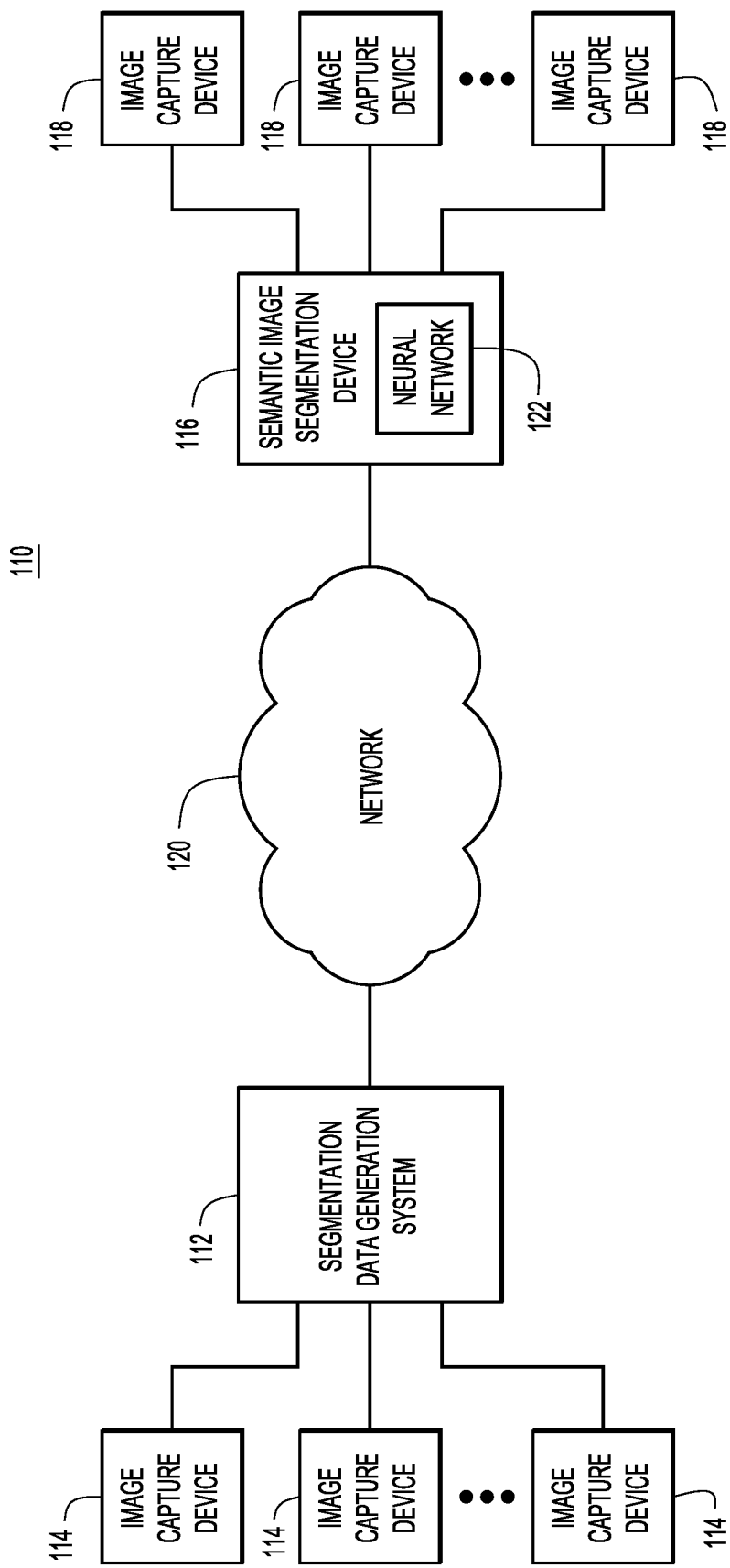
FIG. 1 is a block diagram of an arrangement in which the techniques presented herein may be implemented.

Presented herein are techniques for automatically generating object segmentation training data. In particular, a segmentation data generation system is configured to obtain training images derived from a scene captured by one or more image capture devices. Each training image includes a foreground object and a background. The segmentation data generation system automatically generates a mask of the training image to delineate the object from the background and, based on the mask automatically generates a masked image. The masked image includes only the object present in the training image. The segmentation data generation system composites the masked image with an image of an environmental scene to generate a composite image that includes the masked image and the environmental scene.

DETAILED DESCRIPTION

Semantic image segmentation is a fundamental element in scene understanding and has commercial value in many applications, such as automated surveillance, retail behavior analytics, person re-identification, collaboration, etc. Semantic image segmentation has also become increasingly important for Internet-of-Things (IoT) visual sensing. It is beneficial to train a machine learning-based process, such as a neural network (e.g., deep neural network), to perform semantic image segmentation, for example, in substantially real-time. For ease of illustration, the techniques presented herein are primarily described with reference to the use of neural networks for semantic image segmentation. However, it is to be appreciated that the techniques presented herein may be used with other machine learning-based image segmentation process that perform semantic image segmentation.

In semantic image segmentation, the "data" input to the neural network is a captured image. The neural network attempts to predict or identify a "region of interest" (region) in the image that includes or otherwise represents an object in the image. However, before being enabled to perform semantic image segmentation on unknown captured images (e.g., real-time images in a commercial application), a neural network is first trained using pre-labeled training data, sometimes referred to herein as object segmentation training data. Pre-labeled training data is comprised of known images coupled with associated "region and label (region/label) pairs," which represents the object(s) in the known image. In general, the "region" component of a region/label pair indicates a shape within the image that corresponds to the objects, while the "label" component indicates what the shape represents (e.g., person, car, animal, etc.). A region may be a contiguous or non-contiguous shape in the image coordinate space. A "pixel-wise region" has an arbitrary shape with pixel resolution. A "rectangular region" is defined by a bounding box. As used herein, reference to a "region" may refer to a pixel-wise region, a rectangular region, or any other shaped region within an image coordinate space.

The effectiveness of a neural network in performing semantic image segmentation is strongly correlated to the training of the neural network, particularly the quality and quantity of the pre-labeled training data (i.e., the sets of known images and associated region and label pairs that are used to train the neural network to perform the semantic image segmentation). In conventional arrangements, the pre-labeled data training data is generated through a manual process that requires humans to manually create a mask for an associated image. In particular, a human annotator manually classifies each region of an image to indicate whether or not the region corresponds to a portion of object (e.g., manually point and click techniques to identify the boundary between the object and the background). This manual process is considerably time consuming and limits the amount of pre-labeled training data that is available for use by neural networks.

In order to improve the effectiveness of a neural network in performing semantic image segmentation, presented herein are techniques for automatically generating pre-labeled training data (object segmentation training data). The techniques presented herein provide the capability to generate large amounts of pre-labeled training data which, when used to train a neural network, directly leads to better performance of the neural network for semantic image segmentation.

FIG. 1 is a block diagram of an arrangement 110 in which the techniques presented herein may be implemented. Shown in FIG. 1 is a segmentation data generation system 112, one or more image capture devices 114, a semantic image segmentation device 116, and one or more other image capture devices 118. The image capture devices 114 are in wired or wireless communication with the segmentation data generation system 112, while the image capture devices 118 are in wired or wireless communication with the semantic image segmentation device 116.

As described further below, the image capture devices 114 and 118 are configured to capture still or moving images of scenes that include a foreground object (e.g., person) and a background. The image capture devices 114 and 118 may be, for example, digital cameras, video cameras (e.g., security cameras, web cameras), streaming cameras, etc. that capture still or moving images of one or more persons and provides these images to the training data system 112 or the a semantic image segmentation device 116, respectively. In the case of image capture devices that capture moving images, such as streaming content, the image capture devices can extract snapshots/still frames from the moving images and provide those extracted snapshots/still frames to the segmentation data generation system 112 or the semantic image segmentation device 116. Alternatively, image capture devices that capture moving images may provide the moving images to the segmentation data generation system 112 or the semantic image segmentation device 116 for extraction of snapshots/still frames therefrom. Therefore, as used herein, the term "captured images" or "captured scenes" includes both still and moving images. For ease of description, the captured images used by the segmentation data generation system 112 and the semantic image segmentation device 116 are referred to as "training images" that are derived from a captured scene. A training image includes zero or more foreground objects (e.g., persons) and a background.

As described further below, the segmentation data generation system 112 comprises at least one computing device that is configured to automatically generate pre-labeled training data from the captured images received from the image capture devices 114. Also as described further below, the pre-labeled training data comprises sets of known composite images that are coupled with an associated "region and label (region/label) pairs." In the examples presented herein, the region/label pairs represents the object(s) in the associated composite image. In particular, the "region" component of a region/label pair indicates a shape within the composite image that corresponds to the object(s), while the "label" component indicates what the shape represents (e.g., person, car, animal, etc.). The region may be any contiguous or non-contiguous shape in the image coordinate space.

More specifically, the segmentation data generation system 112 provides the automatically generated pre-labeled training data (i.e., sets of composite images and associated region/label pairs) to the semantic image segmentation device 116 via, for example, a network 120 (e.g., local area network, wide area network, etc.). The semantic image segmentation device 116 includes a machine learning-based image segmentation process, referred to as neural network 122. The neural network 122 is trained, using the automatically generated pre-labeled training data received from the segmentation data generation system 112, to perform semantic image segmentation so as to detect the presence of objects in images captured by the image capture devices 118. In other words, the semantic image segmentation device 116 uses the automatically generated pre-labeled training data to train itself to detect objects in captured images (e.g., to perform image segmentation on unknown images).

Further details regarding the operation of the segmentation data generation system 112 and the semantic image segmentation device 116 are provided below. For ease of illustration, the techniques will be described with reference to training one type of machine learning-based image segmentation process, namely a neural network, to detect persons within captured images. However, it is to be appreciated that the techniques presented herein may be utilized for detection of other types of objects within images. It is also to be appreciated that the techniques presented herein may be used with other types of machine learning-based image segmentation processes.

Figure 2:
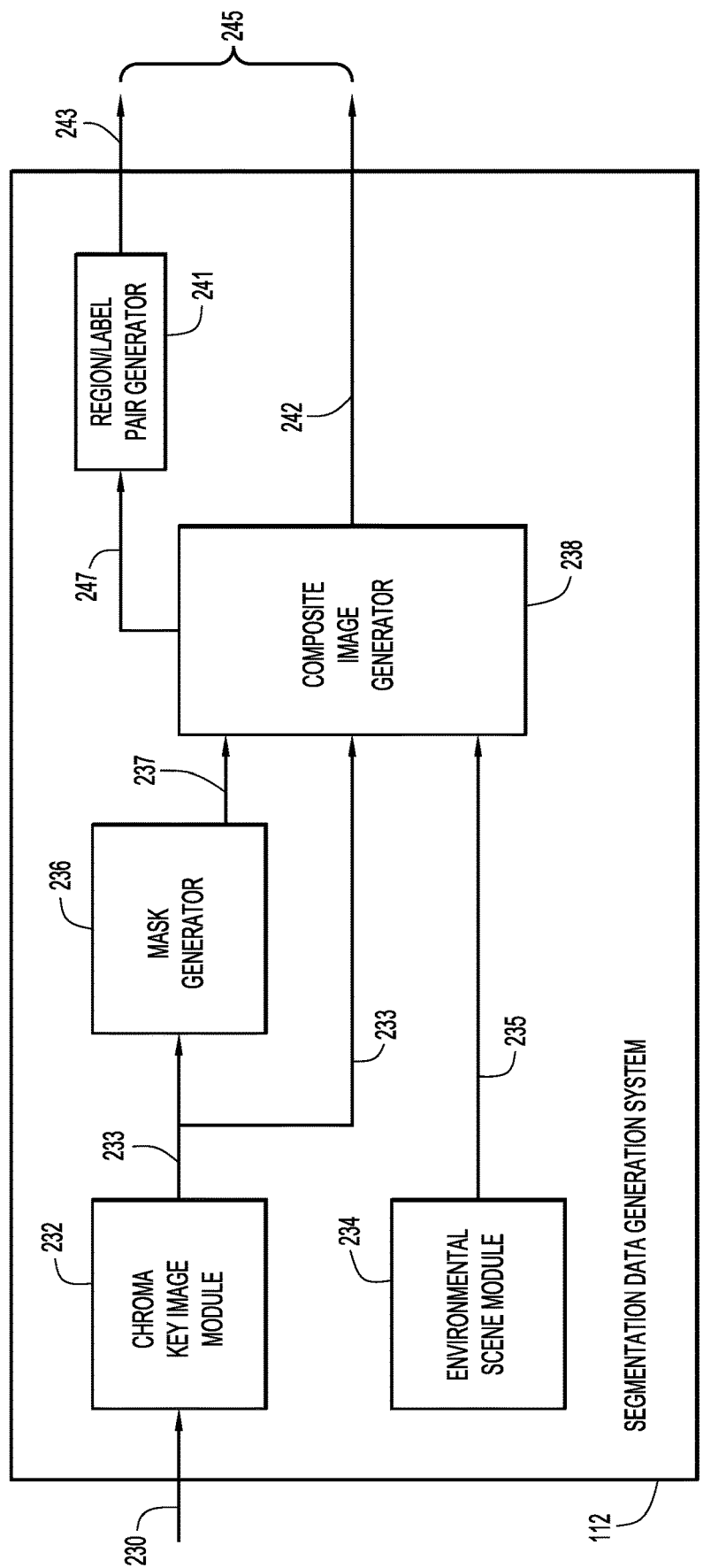
FIG. 2 is a functional block diagram of a segmentation data generation system, in accordance with embodiments presented herein.

FIG. 2 is a functional block diagram illustrating one arrangement for the segmentation data generation system 112 in accordance with examples presented herein. The segmentation data generation system 112 comprises an image intake module 232, an environmental scene module 234, a mask generator 236, a composite image generator 238, and a region/label pair generator 241.

The segmentation data generation system 112 of FIG. 2 utilizes a chroma or color key approach (e.g., a "green screen") to create a binary mask of the human body. In these examples, the image capture device(s) (not shown in FIG. 2) capture images 230 of persons in front of (i.e., in the foreground of) a uniform color background, such as uniform green or blue background.

As noted above, FIG. 2 illustrates a system that utilizes a chroma key approach. As such, the image intake module 232 is sometimes referred to herein as a chroma key image module. The chroma key image module 232 is configured to prepare the captured images 230 for subsequent processing by the mask generator 236 and the composite image generator 238.

As noted above, the captured images 230 may comprise still or moving images that are received from the image capture devices and, as such, the chroma key image module 232 may be configured to perform a number of different operations to prepare the captured images 230 for subsequent processing. In examples in which still images are received, the chroma key image module 232 may be configured to store the received images, sort and/or select from the received images, etc. In certain examples in which moving images are received, the chroma key image module 232 may be configured to extract still images from the moving images, as well as store, sort, select, etc. the extracted images. Regardless of the specific operations performed thereby, the chroma key image module 232 provides training images 233 to both the mask generator 236 and the composite image generator 238.

Figure 3A:
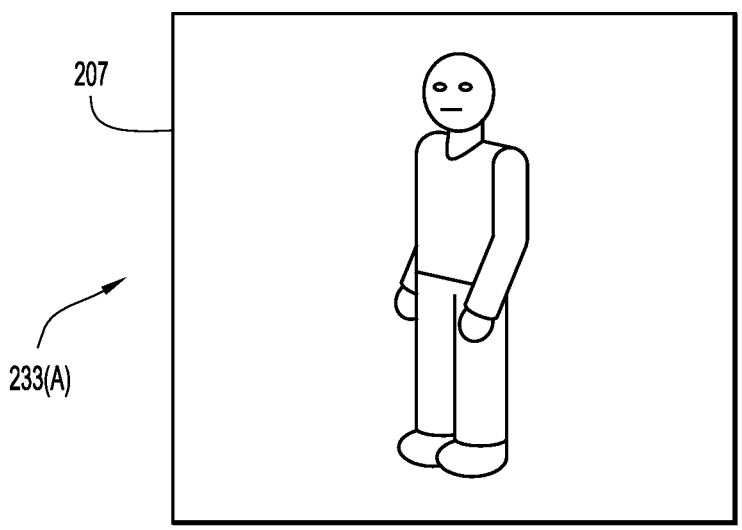
FIGS. 3A, 3B, and 3C are schematic representations of training images that may be output by a chroma key image module of a segmentation data generation system, in accordance with embodiments presented herein.
Figure 3B:
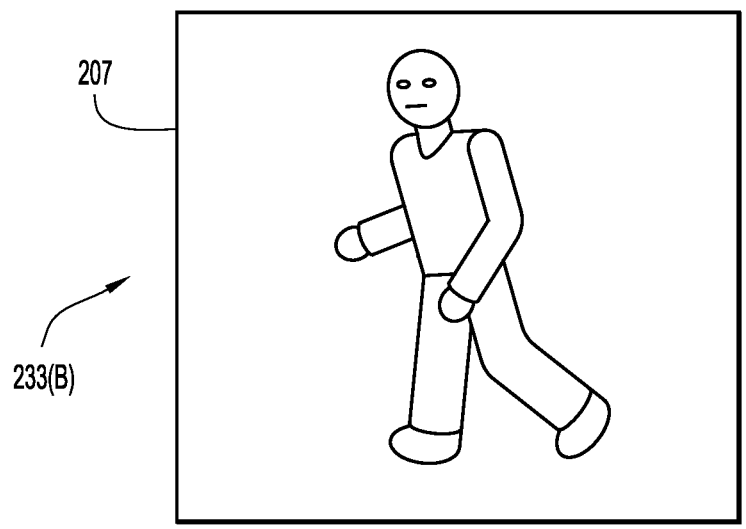
Figure 3C:
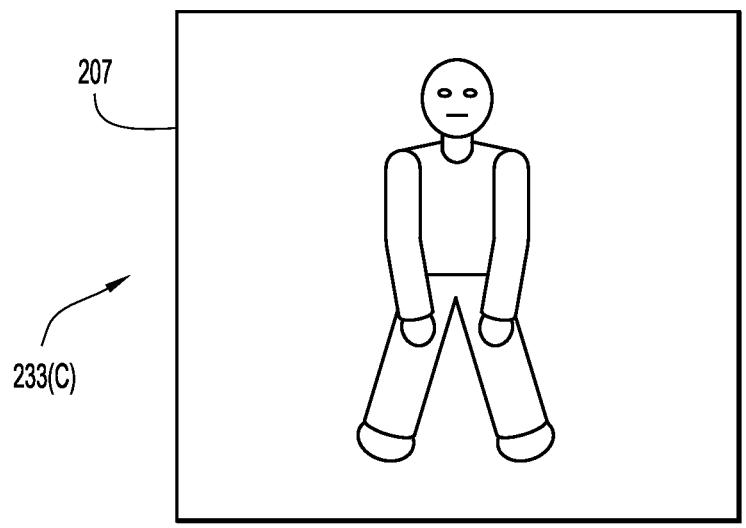

FIGS. 3A, 3B, and 3C are schematic representations 233(A), 233(B), and 233(C), respectively, of training images that may be output by the chroma key image module 232. The representations 233(A), 233(B), and 233(C) each illustrate the still image of a different person captured in front of a green screen 207.

Returning to FIG. 2, upon receiving a training image 233, the mask generator 236 is configured to create a binary mask of the person (i.e., the human body) in the training image so as to delineate the foreground person in the training image from the solid background. The binary mask is generated automatically using the chroma key to identify which portions of the training image 233 are green (i.e., corresponding to the background) and which portions of the training image 233 are not green (i.e., corresponding to the person). For each training image 233 that is received from the chroma key image module 232, the mask generator 236 provides a mask 237 to the composite image generator 238.

Figure 4A:
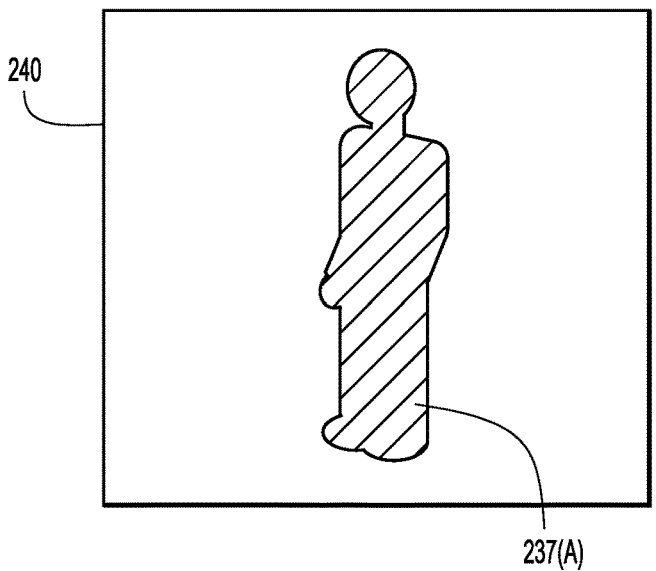
FIGS. 4A, 4B, and 4C are schematic representations of masks that may be generated based on training images, in accordance with embodiments presented herein.
Figure 4B:
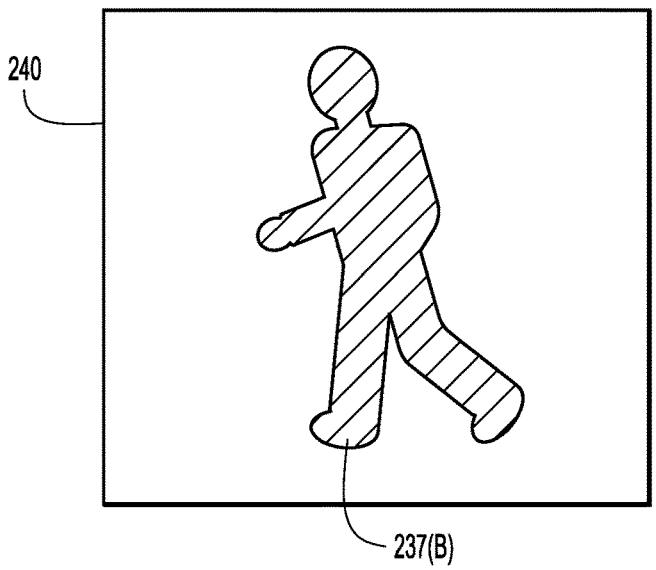
Figure 4C:
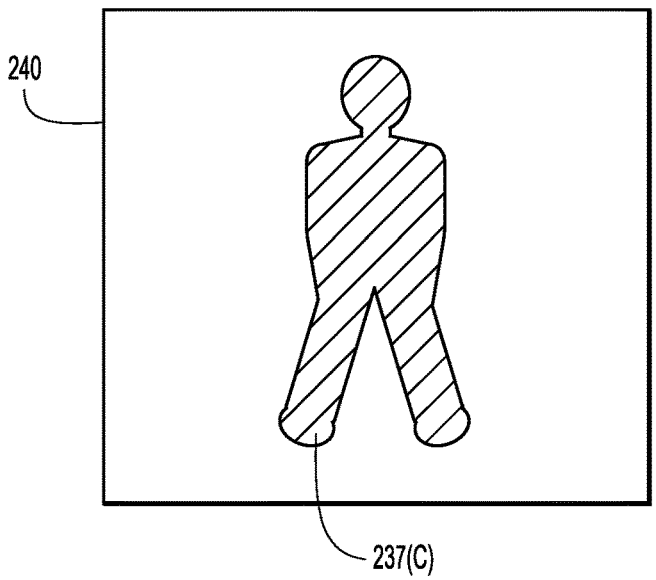

FIGS. 4A, 4B, and 4C are schematic representations of masks that may be generated for the training images 233(A), 233(B), and 233(C), respectively, of FIGS. 3A, 3B, and 3C. In FIGS. 4A, 4B, and 4C, the areas labeled as 237(A), 237(B), and 237(C) are the "masks" and correspond to the non-green areas in FIGS. 3A, 3B, and 3C, respectively. That is, the masks correspond to the persons in FIGS. 3A, 3B, and 3C. The areas labeled as 240 in FIGS. 4A, 4B, and 4C correspond to the green screen areas in the schematic representations of FIGS. 3A, 3B, and 3C.

As noted above, the composite image generator 238 receives training images 233 from the chroma key image module 232. For each image, the composite image generator 238 also receives a corresponding mask 237. For example, the composite image generator 238 receives the training images 233(A), 233(B), and 233(C) of FIGS. 3A, 3B, and 3C, and also receives the corresponding masks 237(A), 237(B), and 237(C) of FIGS. 4A, 4B, and 4C.

As noted, the segmentation data generation system 112 comprises an environmental scene module 234. In one example, the environmental scene module 234 is a data store of images/scenes (e.g., still frame images) of "environment" or "background" scenes, such as images of city scenes, nature scenes, etc. The composite image generator 238 also has access to the environmental scene module 234 such that, in addition to the training images 233 and the corresponding masks 237, the composite image generator 238 can obtain (e.g., retrieve, receive, etc.) the stored environmental scenes, which are represented in FIG. 2 by arrow 235, from the environmental scene module 234.

It is to be appreciated that the environmental scenes used by the composite image generator 238 can be generated or otherwise obtained in a number of manners. For example, the environmental scenes could be completely synthetically generated from a photorealistic three-dimensional (3D) computer graphics engine. As such, the specific example of FIG. 2 is merely one example technique for obtaining environmental scenes that may be utilized in the techniques presented herein.

In operation, the composite image generator 238 is configured to use the training images 233, the associated masks 237, and selected environmental scenes 235 to generate composite images 242. More specifically, using the masks 237, the composite image generator 238 can extract the images of the persons from the training images 233 to generate so-called "masked images" (i.e., only the portion of the training image that corresponds to the mask and, accordingly, the person in the training image). The composite image generator 238 is then configured to combine the masked images with one or more different environmental scenes obtained from the environmental scene module 234. As a result, each composite image includes both the masked image (i.e., the person) and the environmental scene.

Figure 5A:
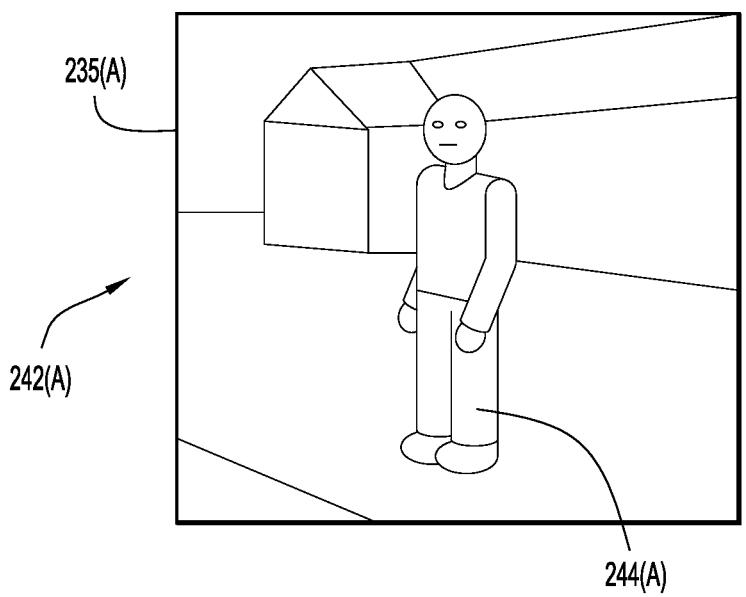
FIGS. 5A, 5B, and 5C are schematic representations of composite images, in accordance with embodiments presented herein.
Figure 5B:
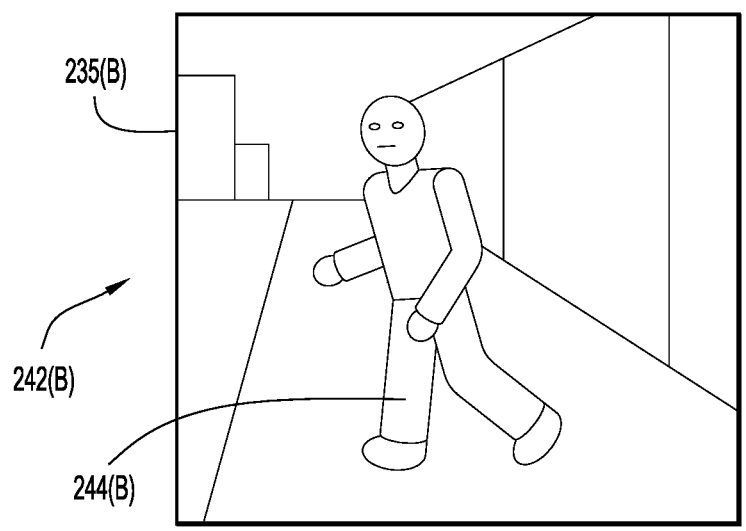
Figure 5C:
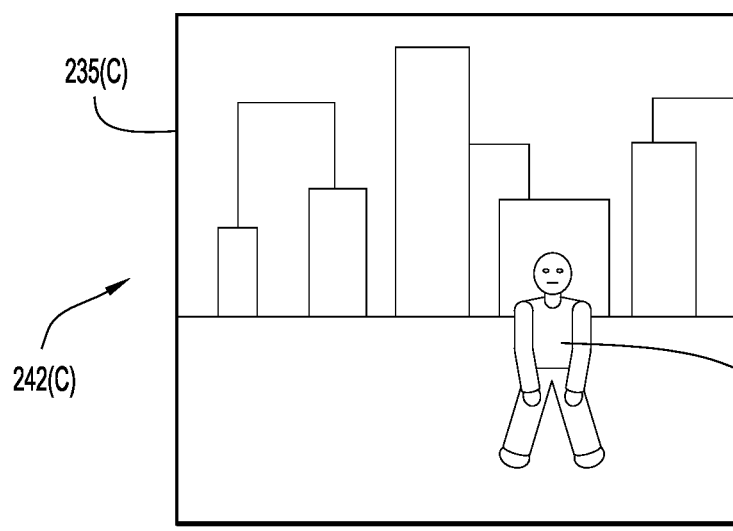

FIGS. 5A, 5B, and 5C are schematic representations 242(A), 242(B), and 242(C), respectively, of composite images that may be generated by the composite image generator 238 in accordance with examples presented herein. The composite image 242(A), which is generated based on the training image 233(A) of FIG. 3A and the associated mask 237(A), includes a masked image 244(A) and an environmental scene 235(A). The masked image 244(A) corresponds to the person in the training image 233(A) and the environmental scene 235(A) is an image obtained from the environmental scene module 234.

Composite images 242(B) and 242(C) are similar to composite image 242(A) and each include a masked image 244(B) and 244(C), respectively, and an environmental scene 235(B) and 235(C), respectively. The masked image 244(B) corresponds to the person in the training image 233(B), while the masked image 244(C) corresponds to the person in the training image 233(C).

Figure 7:
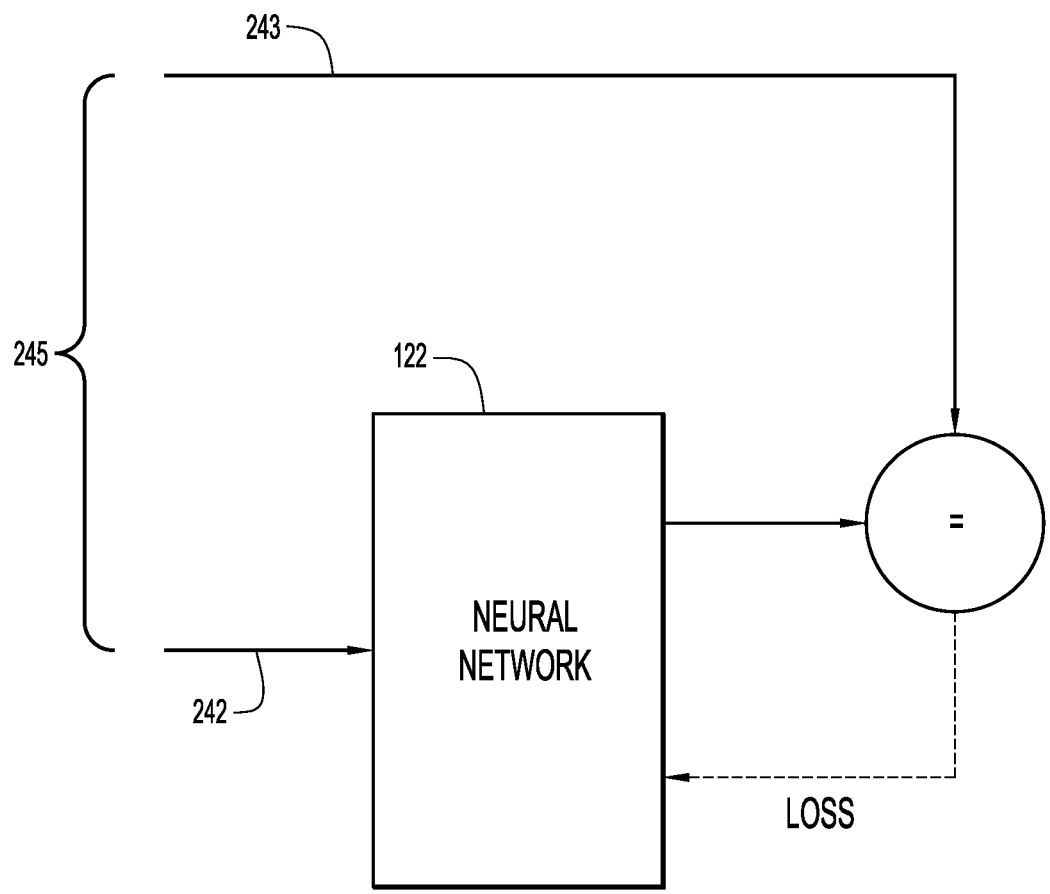
FIG. 7 is a block diagram illustrating training of a neural network using automatically generated object segmentation training data.

Each composite image 242 is associated with mask data 247, which is generated from the mask 237 for the masked image (which was generated by the mask generator 236). However, for use in training neural network 122, the mask data 247 for the composite image 242 is converted/mapped into a region/label pair 243 by the region/label pair generator 241. Therefore, the segmentation data generation system 112 outputs both a composite image 242 and an associated region/label pair 243, which are provided to a semantic image segmentation device that is configured to utilize a neural network for semantic image segmentation operations. A composite image 242 and its associated region/label pair 243 collectively form a pre-labeled training data set 245 which, as described further below with reference to FIG. 7, is used to train a neural network to perform the semantic image segmentation.

The composite image generator 238 may be configured to perform a number of different operations to generate composite images 242. For example, the composite image generator 238 may combine the same masked image with a number of different environmental scenes. In addition, the composite image generator 238 may also apply various translations, rotations, scaling, or other perspective transformations to one or more of the masked image and the environmental scene, as well as occluding (covering) portions of the masked object in different manners. In this way, a large number of pre-labeled training data sets can be generated.

When performing the compositing (i.e., generation of a composite image 242), the composite image generator 238 may be configured to perform coherence matching of a masked image and/or environment scene so that the two images have substantially similar characteristics and, as such, appear natural (i.e., normalize the image and the background). In general, the coherence matching is intended to make the characteristics of the masked image and the composited environment scene substantially the same, so that the neural network can avoid negative learning outcomes (i.e., the coherence matching is designed so that, from the point of view of the neural network, the masked image and the environmental scene have the same characteristics. For example, if the original image is taken under bright light, the masked image should not be superimposed on a darker background as this could cause the network to incorrectly "learn" that the brightest parts of an image correspond to a person, which is not always the case.

The coherence matching may include different color transformations, lighting transformations, etc. to ensure that the masked image and environment scene have approximately the same amount of illumination, same amount of noise (random noise) as well as characteristics of the noise (shot noise vs additive white Gaussian noise), include same spectrum of light (outdoors with wide bandwidth, fluorescent light indoors with different spectrum bandwidth, etc.), or other matching characteristics. In one arrangement, the composite image generator 238 can estimate the statistics of the environmental scene (noise variance and distribution, lighting, shadows, color spectrum, etc.) and apply the same statistics to the masked images for the composite. For example, the composite image generator 238 can estimate the noise in the environmental scene that resulted from the camera acquisition and add/remove/modify the masked image noise level to match that of the environmental scene. As another example, the composite image generator 238 can estimate that the environmental scene was captured under fluorescent lighting while the masked image was captured using incandescent lighting. In these examples, the masked image color spectrum (of the pixels) can be adapted to match that of the environmental scene. In another example, the alpha mask along the edges of the masked image may be blurred in order to make the edge between the foreground masked image and environmental scene appear more natural.

In summary, the composite image generator 238 is configured to perform matching and adapting of noise levels, illumination spectrums, etc., of one or both of a masked image and an environmental scene so that the resulting composite image appears as natural as possible. As such, application of the coherence matching can result in large amounts of synthetically generated visual training data where the characteristics of the masked image and environmental scene are coherent. It is to be appreciated that the applied compositing and/or coherence matching operations can depend on the specific use case. For example, if the machine learning is to be applied to indoor environments, the lighting can be designed for indoor use cases. If the maximum and minimum distance of the camera from a person is Dmax and Dmin, then this can lead to max and min scaling parameters.

For each composite image, there may be several randomized operations which are performed. In such examples, the first is the randomized selection of a background/environmental scene/image. The second is the number of foreground objects (masked images) to composite on to the environmental scene, which can be zero or more. The third is a randomized transformation of each foreground object or environmental scene, which can be translation, scaling, rotation or other transformation which is visually realistic. The final randomization is overall scene modification such as relighting and recoloring. Coherence matching is not randomized, but rather is an additional action which is performed at each random operation in order to ensure visual continuity between the foreground objects and the environmental scene.

FIG. 6 is a functional block diagram illustrating one arrangement for a composite image generator configured to perform coherence matching in accordance with examples presented herein. In these examples, the composite image generator, which is referred to as composite image generator 638, comprises two functional blocks/modules, namely a masked image generation and characteristic estimation module 650 and a coherence matching and composition module 654.

The masked image generation and characteristic estimation module 650 is configured to perform several different operations. First, module 650 receives a training image 233 from the chroma key image module 232 and, using the associated mask 237 received from the mask generator 236, generates a corresponding masked image (i.e., an image of only the person in the training image 233). In FIG. 6, the masked image is represented by arrow 655. In addition to generation of the masked image 655, the module 650 is configured to estimate the characteristics (e.g., lighting, scale, noise, etc.) of the masked image 655. In FIG. 6, these estimated characteristics are represented by arrow 657. As shown, the masked image generation and characteristic estimation module 650 provides the masked image 655 and the estimated characteristics 657 to the coherence matching and composition module 654.

The coherence matching and composition module 654 may operate in a number of different manners to perform the compositing and to ensure the coherence matching. In one example, the coherence matching and composition module 654 uses the estimated characteristics 657 of the masked image to retrieve one or more environmental scenes 235 from the environmental scene module 234 that have certain characteristics (e.g., lighting conditions) that already match those of the masked image 655 (i.e., the module 654 uses the estimated characteristics 657 to select the environmental scenes for compositing with the masked image 655). In such examples, the retrieval of an environmental scene with similar characteristics can lessen the coherence processing applied at the coherence matching and composition module 654. The coherence matching and composition module 654 can adjust characteristics of one or both of the masked image 655 and the environmental scene 235 to ensure the coherence matching.

In other examples, the coherence matching and composition module 654 can receive/retrieve environmental scenes with unknown characteristics (e.g., randomly selected images). In these examples, the coherence matching and composition module 654, or another module, can be configured to estimate the characteristics (e.g., lighting, scale, noise, etc.) of the environmental scene. Using this estimate, as well as the estimate 657, the coherence matching and composition module 654 can adjust characteristics of one or both of the masked image 655 and the environmental scene 235 to ensure the coherence matching.

It is to be appreciated that the functional arrangement of the composite image generator shown in FIG. 6 is merely one example arrangement and that other arrangements are possible. It is also to be appreciated that the modules 650 and 654 can be comprises of one or multiple hardware or software components configured to perform the associated functions.

The above examples have been described with reference to an approach in which a chroma key is used to generate masks for training images. However, it is to be appreciated that the techniques presented herein are not dependent on a chroma key, but instead may be implemented with other mask generation techniques. For example, rather than using a chroma key approach, certain examples presented herein may use a depth camera approach to generate a mask of a person in a captured image. In these examples, a three-dimensional depth camera captures images and the images are processed to extract the foreground (close) object (e.g., person) from the background (farther) objects. In other words, in these arrangements the camera captures a "depth" for every pixel in the scene (e.g., every pixel has a red color component, a green color component, a blue color component, as well as a depth (Z) component) and the depth component is used to determine the portion of the image that is in the foreground and the background, thereby allowing derivation of the mask. In another alternative, outputs from a stereoscopic camera system (i.e., two cameras working together) can be used in a similar manner to differentiate a foreground object (person) from the background and, accordingly, automatically generate image masks. In another alternative, a depth by focus system can use multiple cameras with multiple focus, or a single camera that takes multiple pictures using different focal lengths, to perform depth from focus and then separate the scene into different regions.

As noted above, the techniques presented herein generate data which can be used to train a neural network to predict segmentation masks for unknown images. This training process is generally depicted in FIG. 7 where the neural network 122 of FIG. 1 receives a pre-labeled training data set 245 comprises of the composite image 242 (e.g., FIGS. 5A-5C) and the region/label pair 243. Shown in FIG. 7 is a "loss," which represents the error between what the neural network 122 predicts as the region and the region/label pair 243. The determined loss is fed back to the neural network 122 and used to adapt the network until the predicted region approximates the actual region (i.e., the network trains itself by minimizing the loss/error).

Figure 8:
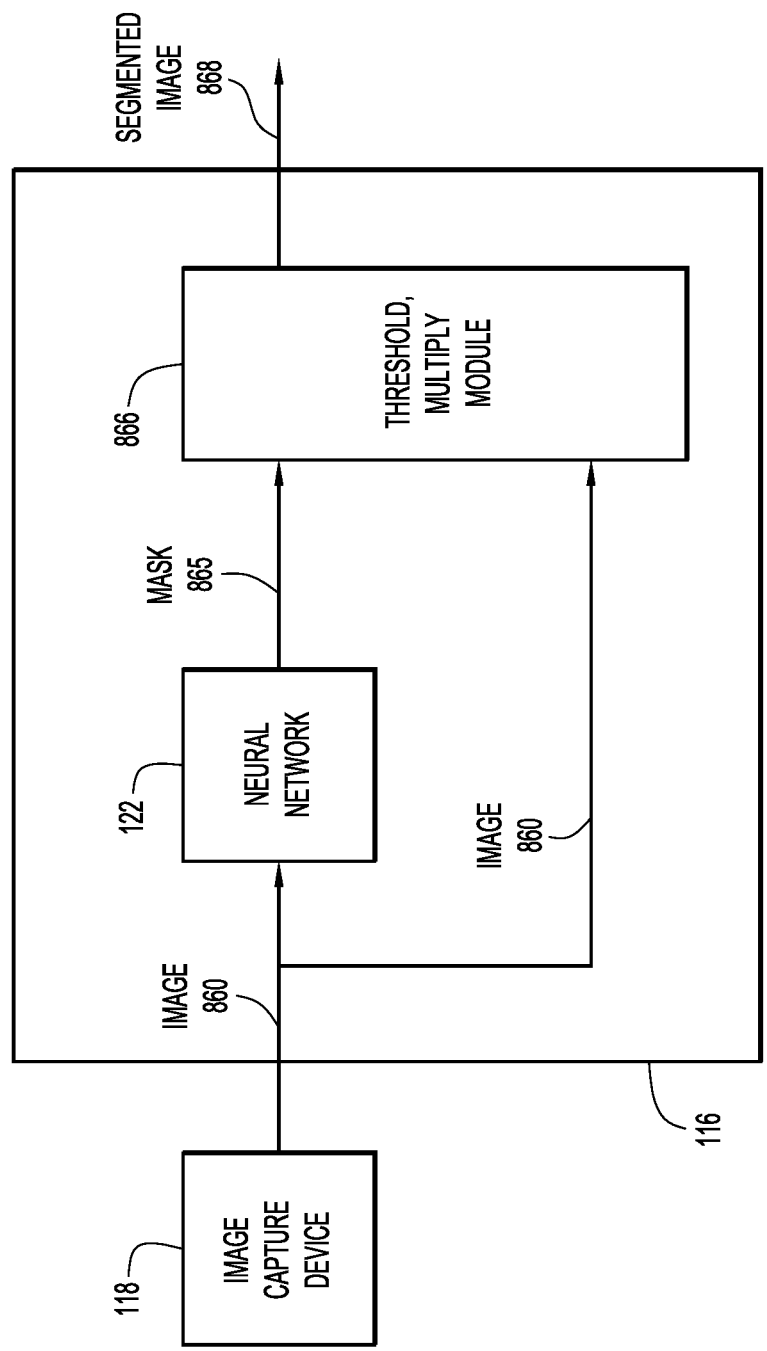
FIG. 8 is a block diagram illustrating the use of a trained neural network to generate a segmented image based on automatically generated object segmentation training data.
Figure 10A:
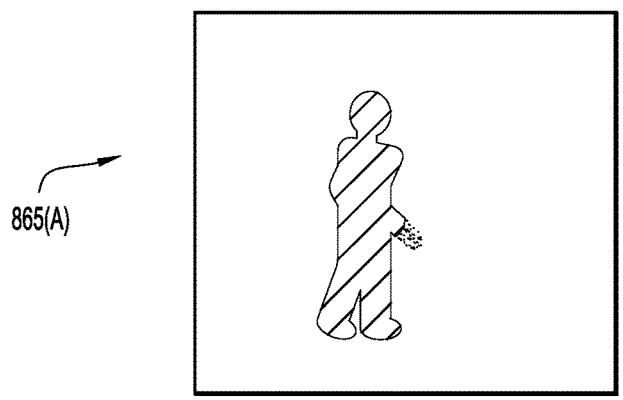
FIGS. 10A, 10B, 10C, and 10D are schematic representations of predicted masks that may be generated for the captured images of FIGS. 9A, 9B, 9C, and 9D, respectively.
Figure 10B:
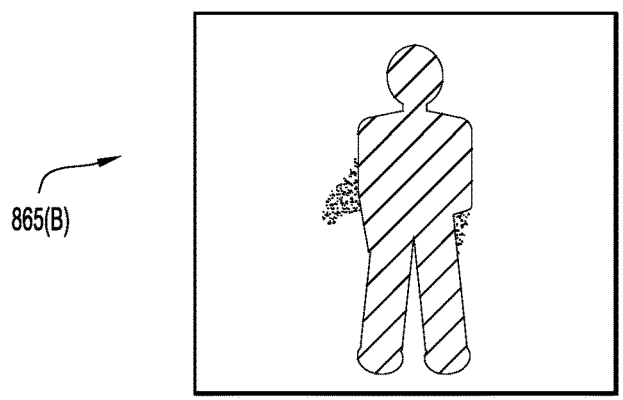
Figure 10C:
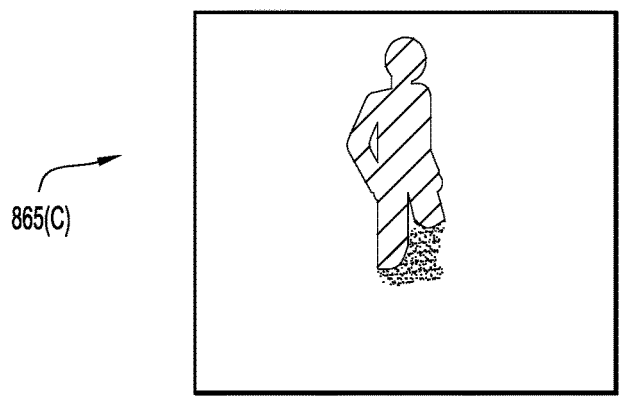
Figure 10D:
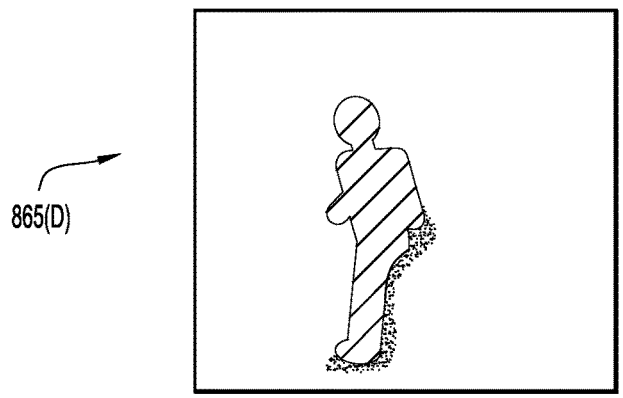

FIG. 8 is a block diagram illustrating one arrangement of the semantic image segmentation device 116 (FIG. 1) that uses the trained neural network 122 to generate a segmented image. More specifically, one or more image capture devices 118 capture an image 860 that is provided to the neural network 122. FIGS. 9A, 9B, 9C, and 9D are schematic representations of images 860(A), 860(B), 860(C), and 860(D), respectively, that may be captured by an image capture device 118.

For ease of illustration, FIG. 8 illustrates an example in which the image capture devices 118 provide still images to the semantic image segmentation device 116. However, as noted above, in other arrangements the semantic image segmentation device 116 may receive moving images and extract still images therefrom.

In the arrangement of FIG. 8, the neural network 122 generates a predicted mask 865 for the image 860. FIGS. 10A, 10B, 10C, and 10D are schematic representations of predicted masks 865(A), 865(B), 865(C), and 865(D), respectively, that may be generated for the images 860(A), 860(B), 860(C), and 860(D), respectively.

A threshold, multiply module 866 uses the predicted mask 865 to processes the image 860 and generate a segmented image 868. FIGS. 11A, 11B, 11C, and 11D are schematic representations of segmented images 868(A), 868(B), 868(C), and 868(D), respectively, in accordance with examples presented herein. The segmented images 868(A), 868(B), 868(C), and 868(D) are the threshold, multiple result of the images 860(A), 860(B), 860(C), and 860(D) and the corresponding predicted masks 865(A), 865(B), 865(C), and 865(D), respectively. Although not shown in FIG. 8, the various image processing techniques including morphological image processing can be applied to potentially improve or validate the segmentation.

Figure 12:
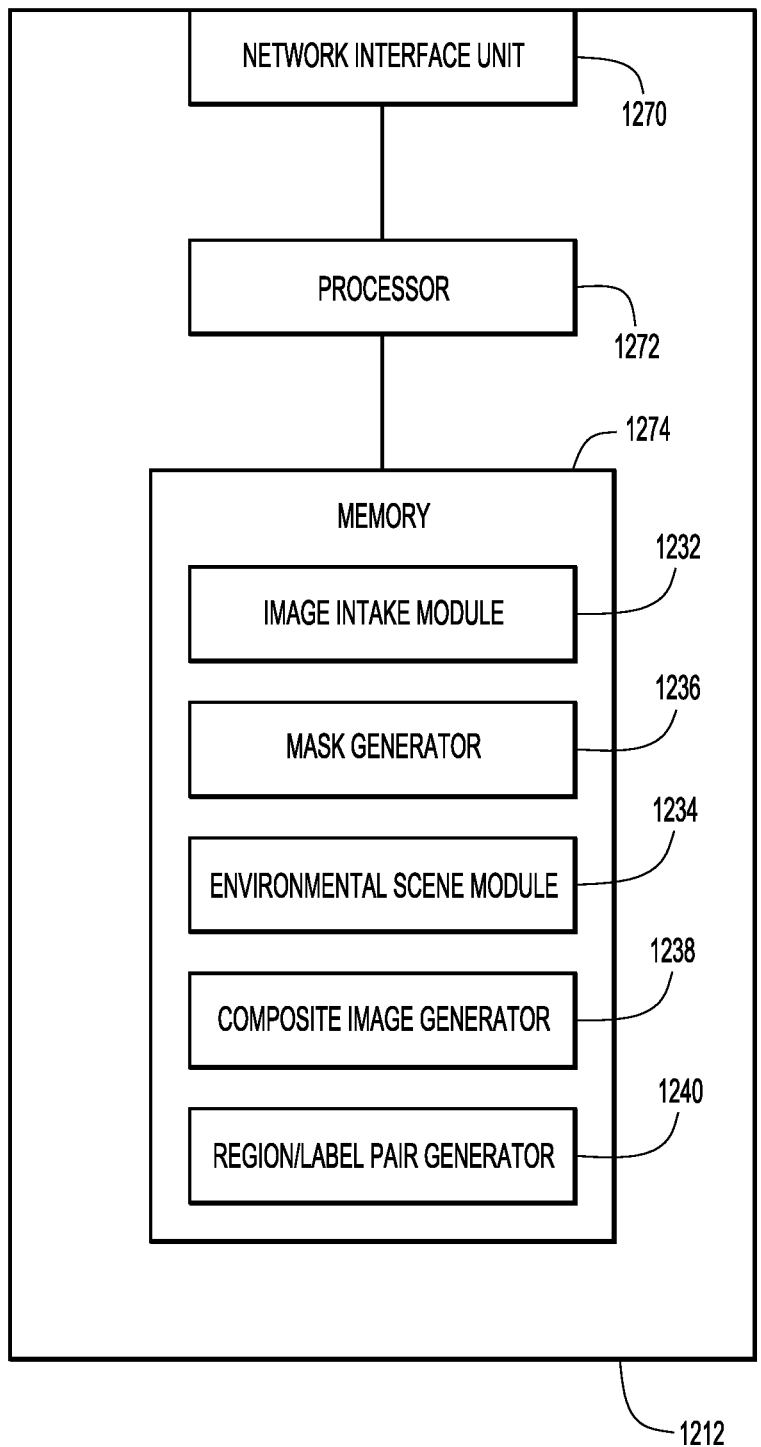
FIG. 12 is a block diagram of a computing device configured for automatically generating object segmentation training data, in accordance with embodiments presented herein.

FIG. 12 is a block diagram of a computing device 1212 configured for automatically generating object segmentation training data, in accordance with embodiments presented herein. That is, FIG. 12 illustrates one arrangement for a segmentation data generation system in accordance with embodiments presented herein.

The segmentation data generation system includes a network interface unit 1270 to enable network communications, one or more processors 1272, and memory 1274. The memory 1274 stores software modules that include an image intake module 1232, mask generator 1236, an environmental scene module 1234, a composite image generator 1238, and a region/label pair generator 1240. These software modules, when executed by the one or more processors 1272, causes the one or more processors to perform the operations described herein with reference to a segmentation data generation system. That is, the memory 1274 may include Read Only Memory (ROM), Random Access Memory (RAM), magnetic disk storage media devices, optical storage media devices, flash memory devices, electrical, optical, or other physical/tangible memory storage devices. Thus, in general, the memory 1274 may comprise one or more tangible (non-transitory) computer readable storage media (e.g., a memory device) encoded with software comprising computer executable instructions and when the software is executed (by the controller) it is operable to perform the operations described herein.

Figure 13:
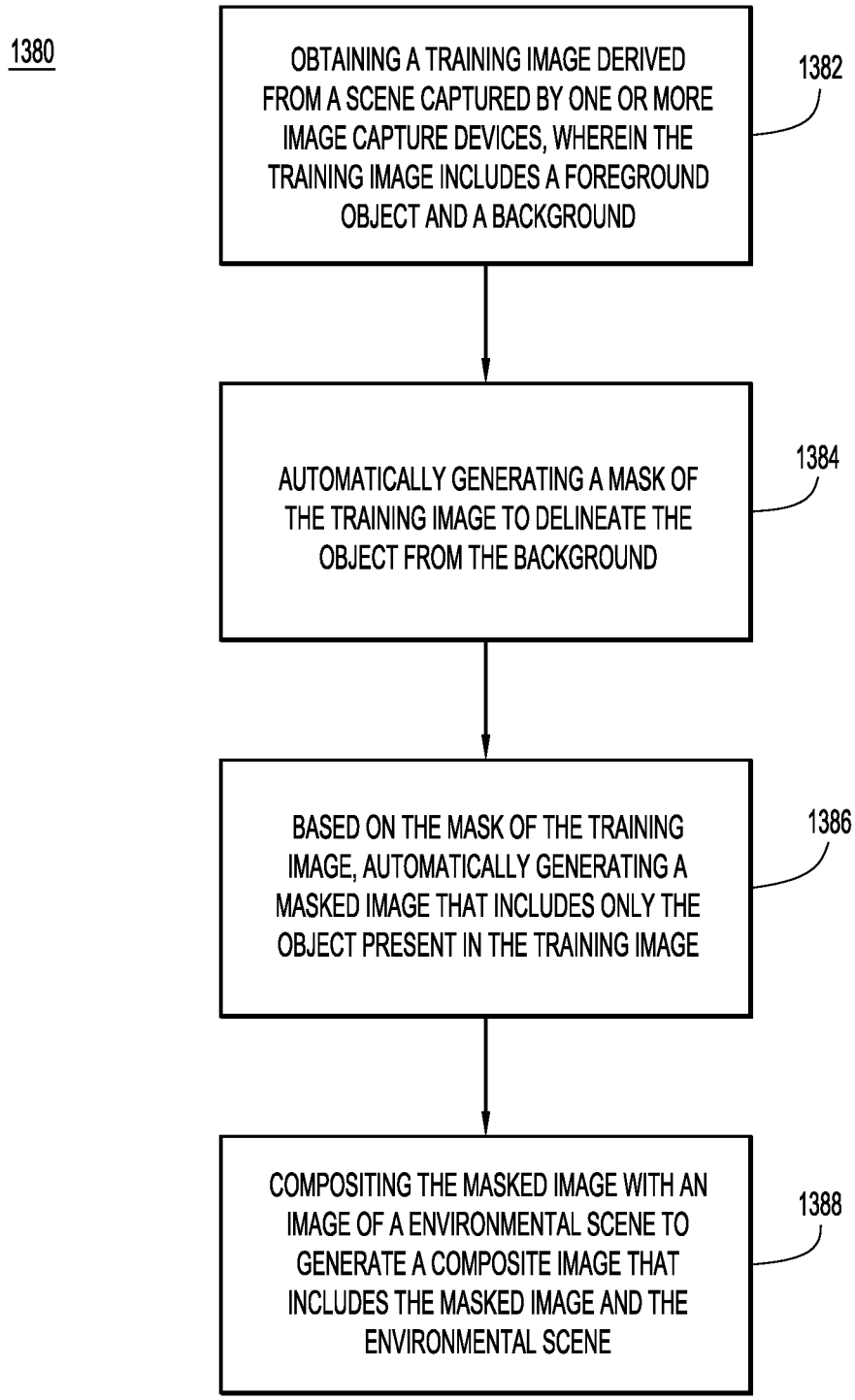
FIG. 13 is a flowchart of a method for automatically generating object segmentation training data, in accordance with embodiments presented herein.

FIG. 13 is a flowchart of a method 1380 for automatically generating object segmentation training data, in accordance with embodiments presented herein. Method 1300 begins at 1382 where a segmentation data generation system obtains a training image derived from a scene captured by one or more image capture devices. The training image includes a foreground object and a background. At 1384, the segmentation data generation system automatically generates a mask of the training image to delineate the object from the background. At 1386, based on the mask of the training image, the segmentation data generation system automatically generates a masked image that includes only the object present in the training image. At 1388, the segmentation data generation system composites the masked image with an image of a environmental scene to generate a composite image that includes the masked image and the environmental scene.

A neural network is a powerful tool, but relies on a large amount of labeled data to be effective. As described above, the techniques presented herein automatically generate training data for the image semantic segmentation problem. By producing large amounts of inexpensive training data, the techniques presented herein provide an advantage over manual methods when training neural networks to perform semantic image segmentation.

In summary, in one form, a computer implemented method is provided comprising: obtaining a training image derived from a scene captured by one or more image capture devices, wherein the training image includes a foreground object and a background; automatically generating a mask of the training image to delineate the object from the background; based on the mask of the training image, automatically generating a masked image that includes only the object present in the training image; and compositing the masked image with an image of a environmental scene to generate a composite image that includes the masked image and the environmental scene.

In another form, an apparatus is provided comprising: a memory; a network interface unit; and a processor configured to: obtain a training image derived from a scene captured by one or more image capture devices, wherein the training image includes a foreground object and a background; automatically generate a mask of the training image to delineate the object from the background; based on the mask of the training image, automatically generate a masked image that includes only the object present in the training image; and composite the masked image with an image of a environmental scene to generate a composite image that includes the masked image and the environmental scene.

In yet another form, one or more non-transitory computer readable storage media are provided which are encoded with instructions that, when executed by a processor, cause the processor to: obtain a training image derived from a scene captured by one or more image capture devices, wherein the training image includes a foreground object and a background; automatically generate a mask of the training image to delineate the object from the background; based on the mask of the training image, automatically generate a masked image that includes only the object present in the training image; and composite the masked image with an image of a environmental scene to generate a composite image that includes the masked image and the environmental scene.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A method comprising:
   obtaining a training image derived from a scene captured by one or more image capture devices, wherein the training image includes a foreground object and a background;
   automatically generating a mask of the training image to delineate the foreground object from the background;
   based on the mask of the training image, automatically generating a masked image that includes only the foreground object present in the training image;
   compositing the masked image with an image of an environmental scene to generate a composite image that includes the masked image and the environmental scene; and
   performing coherence matching of the masked image and the environmental scene by adjusting lighting characteristics to cause the masked image and the environmental scene to have substantially the same amount of illumination.

2. The method of claim 1, further comprising:
   generating a region and label pair which represents the masked image in the composite image, wherein the composite image and the region and label pair form an object segmentation training data set; and
   providing the object segmentation training data set to a machine learning-based image segmentation process.

3. The method of claim 1, wherein compositing the masked image with the image of the environmental scene comprises:
   performing one or more translations, rotations, scaling, or other perspective transformations to one or more of the masked image and the environmental scene.

4. The method of claim 1, wherein adjusting the lighting characteristics causes the masked image and the environmental scene to include substantially the same spectrum of visible light.

5. The method of claim 1, further comprising:
   adjusting noise characteristics of at least one of the masked image or the environmental scene such that the masked image and the environmental scene include substantially the same amount of random noise.

6. The method of claim 1, wherein automatically generating a mask of the training image to delineate the foreground object from the background comprises:
   automatically generating a binary mask of the training image.

7. The method of claim 6, wherein automatically generating the binary mask of the training image comprises:
   using at least one of a chroma key approach or a depth camera approach to generate the binary mask.

8. The method of claim 1, wherein compositing the masked image with the image of the environmental scene comprises performing coherence matching of the masked image and the environmental scene to normalize the masked image and the environmental scene.

9. An apparatus comprising:
   a memory;
   a network interface unit; and
   a processor configured to:
      obtain a training image derived from a scene captured by one or more image capture devices, wherein the training image includes a foreground object and a background;
      automatically generate a mask of the training image to delineate the foreground object from the background;
      based on the mask of the training image, automatically generate a masked image that includes only the foreground object present in the training image;
      composite the masked image with an image of an environmental scene to generate a composite image that includes the masked image and the environmental scene; and
      perform coherence matching of the masked image and the environmental scene by adjusting lighting characteristics to cause the masked image and the environmental scene to have substantially the same amount of illumination.

10. The apparatus of claim 9, wherein the processor is configured to:
    generate a region and label pair which represents the masked image in the composite image, wherein the composite image and the region and label pair form an object segmentation training data set; and
    provide the object segmentation training data set to a machine learning-based image segmentation process.

11. The apparatus of claim 9, wherein to composite the masked image with the image of the environmental scene, the processor is configured to:
    perform one or more translations, rotations, scaling, or other perspective transformations to one or more of the masked image and the environmental scene.

12. The apparatus of claim 9, wherein to adjust the lighting characteristics of at least one of the masked image or the environmental scene, the processor is configured to:
    cause the masked image and the environmental scene to include substantially the same spectrum of visible light.

13. The apparatus of claim 9, wherein the processor is further configured to:
    adjust noise characteristics of at least one of the masked image or the environmental scene such that the masked image and the environmental scene include substantially the same amount of random noise.

14. The apparatus of claim 9, wherein the processor is configured to composite the masked image with the image of the environmental scene by performing coherence matching of the masked image and the environmental scene to normalize the masked image and the environmental scene.

15. One or more non-transitory computer readable storage media encoded with instructions that, when executed by a processor, cause the processor to:
- obtain a training image derived from a scene captured by one or more image capture devices, wherein the training image includes a foreground object and a background;
- automatically generate a mask of the training image to delineate the foreground object from the background;
- based on the mask of the training image, automatically generate a masked image that includes only the foreground object present in the training image;
- composite the masked image with an image of an environmental scene to generate a composite image that includes the masked image and the environmental scene; and
- perform coherence matching of the masked image and the environmental scene by adjusting lighting characteristics to cause the masked image and the environmental scene to have substantially the same amount of illumination.

16. The non-transitory computer readable storage media of claim 15, further comprising instructions operable to:
- generate a region and label pair which represents the masked image in the composite image, wherein the composite image and the region and label pair form an object segmentation training data set; and
- provide the object segmentation training data set to a machine learning-based image segmentation process.

17. The non-transitory computer readable storage media of claim 15, wherein the instructions operable to composite the masked image with the image of the environmental scene comprise instructions operable to:
- perform one or more translations, rotations, scaling, or other perspective transformations to one or more of the masked image and the environmental scene.

18. The non-transitory computer readable storage media of claim 15, wherein the instructions operable to composite the masked image with the image of the environmental scene comprise instructions operable to:
- perform coherence matching of the masked image and the environmental scene to normalize the masked image and the environmental scene.

19. The non-transitory computer readable storage media of claim 15, wherein the instructions operable to perform coherence matching of the masked image and the environmental scene comprise instructions operable to:
- adjust lighting characteristics of at least one of the masked image or the environmental scene such that the masked image and the environmental scene have substantially the same spectrum of visible light.

20. The non-transitory computer readable storage media of claim 15, wherein the instructions operable to perform coherence matching of the masked image and the environmental scene comprise instructions operable to:
- adjust noise characteristics of at least one of the masked image or the environmental scene such that the masked image and the environmental scene include substantially the same amount of random noise.

* * * * *